United States Patent
Ye et al.

(10) Patent No.: US 12,406,780 B1
(45) Date of Patent: Sep. 2, 2025

(54) INSULATED WIRE AND PREPARATION METHOD THEREOF, COIL AND ELECTRONIC/ELECTRICAL DEVICE

(71) Applicant: WELL ASCENT ELECTRONIC (GANZHOU) CO., LTD., Jiangxi (CN)

(72) Inventors: Huimin Ye, Jiangxi (CN); Yuejia Zhu, Jiangxi (CN); Zuomao Zhu, Jiangxi (CN)

(73) Assignee: WELL ASCENT ELECTRONIC (GANZHOU) CO., LTD., Jiangxi (CN)

( * ) Notice: Subject to any disclaimer, the term of this patent is extended or adjusted under 35 U.S.C. 154(b) by 0 days.

(21) Appl. No.: 19/005,964

(22) Filed: Dec. 30, 2024

(30) Foreign Application Priority Data

Jun. 28, 2024 (CN) .......................... 202410858368.5

(51) Int. Cl.
*H01B 7/02* (2006.01)
*H01F 5/00* (2006.01)

(52) U.S. Cl.
CPC ................ *H01B 7/02* (2013.01); *H01F 5/00* (2013.01)

(58) Field of Classification Search
None
See application file for complete search history.

(56) References Cited

U.S. PATENT DOCUMENTS

| | | |
|---|---|---|
| 2016/0307663 A1 | 10/2016 | Ikeda et al. |
| 2019/0066868 A1 | 2/2019 | Hirayama et al. |
| 2019/0156978 A1 | 5/2019 | Tamura et al. |
| 2021/0005346 A1* | 1/2021 | Tomizawa ................ H01F 5/06 |

FOREIGN PATENT DOCUMENTS

| | | | |
|---|---|---|---|
| CN | 104710788 A | | 6/2015 |
| CN | 111566759 A | | 8/2020 |
| CN | 116622069 | * | 8/2023 |
| CN | 116622069 A | | 8/2023 |
| CN | 118398285 A | | 7/2024 |
| JP | 2008288106 A | | 11/2008 |

OTHER PUBLICATIONS

Machine Translation of CN116622069 (Year: 2023).*
Chinese First Office Action dated Aug. 5, 2024 issued in CN 202410858368.5.
Notice of Grant dated Aug. 27, 2024 issued in CN 202410858368.5.
Extended European search report dated Jul. 1, 2025 received in European Patent Application No. 24223815.2.

* cited by examiner

*Primary Examiner* — Shawn Mckinnon
(74) *Attorney, Agent, or Firm* — Scully, Scott, Murphy & Presser, P.C.

(57) ABSTRACT

An insulated wire and a preparation method thereof, a coil and an electronic/electrical device are provided. The insulated wire includes a conductor and an insulating layer at the periphery of the conductor. The cross section of the conductor is rectangular, a sunken part is formed in the insulating layer on at least one surface of the conductor, the sunken part extends in the whole length direction of the insulating layer, a convex part is formed in the left and right sides of the sunken part, the distance between the bottommost part of the sunken part and the surface of the conductor is L1, L1 is 50 μm-300 μm, the distance between the bottom of the sunken part and the highest point of the convex part is L2, and the value that L1 is divided by the sum of L2 and L1 is greater than 1.3 and smaller than or equal to 10.

7 Claims, 5 Drawing Sheets

INSULATED WIRE AND PREPARATION METHOD THEREOF, COIL AND ELECTRONIC/ELECTRICAL DEVICE

TECHNICAL FIELD

The present disclosure relates to the technical field of insulated wires, and in particular to an insulated wire and a preparation method thereof, a coil and an electronic/electrical device.

BACKGROUND

An electromagnetic wire in a drive motor produces a lot of heat during the working process, the larger the specification, the greater the heat output. How to quickly cool the electromagnetic wire needs to be solved urgently.

At present, the whole motor is subjected to oil cooling in the industry, that is, the whole motor is immersed in cooling oil. The disadvantage of such cooling method is that when the cooling oil is heated, the whole tank of oil needs to be cooled, which increases the difficulty of rapid cooling. Another method is to introduce a cooling tube between electromagnetic wires, and introduce a coolant into the cooling tube. The coolant flows in the cooling tube, thereby carrying away heat generated by the electromagnetic wire. However, the disadvantage of such cooling method is that the contact area between the cooling tube and the electromagnetic wire is small, resulting in low heat conduction efficiency between the electromagnetic wire and the cooling tube, resulting in low cooling efficiency of the entire motor.

SUMMARY

In view of this, one of the purposes of the present invention is to provide an insulated wire. According to the insulated wire provided by the present invention, a cooling channel can be formed between wires, thus the cooling medium is in direct contact with the insulated wire, thereby improving the heat conduction efficiency, and increasing the cooling speed and efficiency.

To achieve the purpose above, the technical solution of the present invention is as follows:

An insulated wire, including a conductor and an insulating layer arranged at the periphery of the conductor, where the cross section of the conductor takes the shape of a rectangle, a sunken part is formed in the insulating layer on at least one surface of the conductor, the sunken part extends in the whole length direction of the insulating layer, and a convex part is formed in the left and right sides of the sunken part;

the distance between the bottommost part of the sunken part and the surface of the conductor is L1, L1 is 50 μm-300 μm, the distance between the bottommost part of the sunken part and the highest point of the convex part is L2, and the value that L1 is divided by the sum of L2 and L1 is greater than 1.3 and smaller than or equal to 10.

The value of L2 is 30 μm-3000 μm, and if the value of L1 is 50 μm, L2 can be 450 μm or 400 μm and the like correspondingly. To ensure the cooling effect, generally, the larger the depth of the sunken part, that is, the value of L2, the better. However, due to the poor heat dissipation performance of the insulating layer, the larger L2, the larger the sum of L2 and L1, and the thicker the insulating layer, then heat dissipation can be impeded. In addition, a larger L2 can reduce the layers of coils in wiring. Therefore, while ensuring that the production can be achieved by a manufacturing process, the value of L2 only needs to be within 100 μm~3000 μm.

Further, the value of (L2+L1)/L1 is 3-7.

Further, the cross section of the conductor takes the shape of a rounded rectangle, and at least one sunken part is formed on both two long sides thereof.

Further, the angles between two lateral sides of the sunken part and the bottom of the sunken part are both a, and $150° \geq a \geq 90°$.

Further, the bottom of the sunken part takes the shape of waves on the cross section.

Further, a straight line part extending in the width direction is formed on the convex part.

Further, the connecting part of the two lateral sides of the sunken part with the bottom is in circular arc transition.

Further, the insulating layer includes a thermoplastic resin layer or a combination of the thermoplastic resin layer with a bonding layer, and the thermoplastic resin layer is on the outermost side of the insulating layer.

Further, the convex part is formed by the thermoplastic resin layer.

The material of the bonding layer can be a thermosetting resin, which can be formed by directly coating the surface of the conductor and baking and curing. Generally the resin can be at least one of polyimide, polyurethane, polyamide-imide, thermosetting polyester, H-class polyester, polybenzimidazole, polyester imide, melamine resin and epoxy resin.

Further, the material of the bonding layer structurally includes a polymerization unit as shown in formula 1 below:

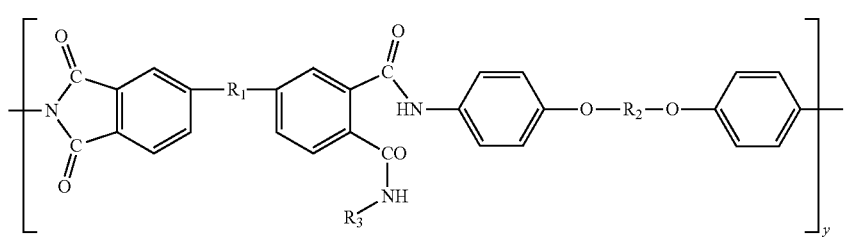

Formula 1 in the formula, R1 and R2 are both aryl; and R3 is $C_{2-12}$ alkyl.

The present invention also provides a preparation method of the structure shown in formula 1, including:
1) preparing a diamine monomer solution and an amine monomer solution mixing a diamine monomer with a dimethylacetamide solvent, and under a nitrogen protected atmosphere, stirring to react for 1-2 h at minus 5-5 DEG C. till the diamine monomer is dissolved so as to obtain the diamine monomer solution;

mixing an amine monomer with the dimethylacetamide solvent, and under a nitrogen protected atmosphere, stably stirring for 1-2 h at minus 5-5 DEG C. till the amine monomer is dissolved or completely mixed so as to obtain the amine monomer solution, where the amine monomer structurally contains one or two amino groups, and contains 2-12 carbon atoms;

2) adding a dianhydride monomer into the diamine monomer solution, and under a nitrogen protected atmosphere, stirring to react for 10-12 h at minus 5-5 DEG C. so as to obtain a polydietheretheramide acid solution;

3) adding the amine monomer solution into the polydietheretheramide acid solution, stirring to react for 2-3 h at minus 5-5 DEG C., and adjusting the solid content and viscosity of the reaction liquid so as to obtain a polydietheretheramide acid finished product;

4) coating a copper wire with the polydietheretheramide acid finished product, heating to 220-300 DEG C. to react for 5-35 min, and after the reaction is completed, further heating to 345-480 DEG C. to react for 10-45 seconds to form a polydietheretherimide binding agent on the surface of the copper wire after the reaction is completed, that is, to form the bonding layer.

What needs to be noted is that the material of the bonding layer of the present invention also structurally includes the polymerization unit as shown in formula 2 below, the ratio of the polymerization unit shown in formula 1 is related to the addition amount of the amine monomer, that is, in the present invention, the structure of the material of the bonding layer is formed by the polymerization units shown in formula 1 and formula 2 through copolymerization, the ratio of the structures shown in formula 1 and formula 2 is related to the addition amount of the amine monomer solution in step 3), the ratio of formula 1 being 5-15% is optimal, and x+y is 10-10000.

lacetamide solvent, the solid content of the polydietheretheramide acid finished product is greater than 21%, and the viscosity is 3000 mPa·S-3500 mPa·S.

The diamine monomer includes one or more of 4,4'-bis (4"-amino phenoxy) diphenyl ketone, 2,2-bis[4'-(4"-amino phenoxy) phenyl]propane, 1,3-bis(4'-amino phenoxy) benzene and 1,4-bis(4'-amino phenoxy) benzene.

The dianhydride monomer includes one or more of bisphenol A dianhydride, 3,3',4,4'-diphenyl ether dianhydride and 3,3',4,4'-triphenyl diether tetracarboxylic dianhydride.

The amine monomer includes one or more of ethylamine, propylamine, butylamine, aniline, naphthylamine and benzidine.

Further, the material of the thermoplastic resin layer is at least one of general engineering plastic, super engineering plastic or a polymer alloy containing engineering plastic.

The general engineering plastic includes any one or a combination of polyamide, polyacetal, polycarbonate, polyphenylene ether, syntactic polystyrene resin, polybutylene terephthalate, polyethylene terephthalate, polyethylene naphthalate and polyethylene;

the super engineering plastic includes any one or a combination of polyetherimide, polyphenylene, polysulfone, polysulfone, polyethersulfone, polyphenylene sulfide, polyarylester, polyamide-imide, polyether ketone, polyaryletherketone, tetrafluoroethylene ethylene copolymers, polyether-ether-ketone, polyethylene ketone ketone, tetrafluoroethylene-perfluoroalkyl vinyl ether copolymers, polytetrafluoroethylene, thermoplastic polyimide resin, thermoplastic polyamide-imide and liquid crystal polyester;

The polymer alloy containing engineering plastic includes a polymer alloy with polyethylene terephthalate and polyethylene naphthalate as basic resins, a polymer alloy obtained by comixing ABS with polycarbonate, a polymer alloy obtained by comixing nylon 6,6 with an aromatic polyamide resin, a polymer alloy obtained by polyphenylene ether with nylon 6,6, a polymer alloy obtained by polyphe-

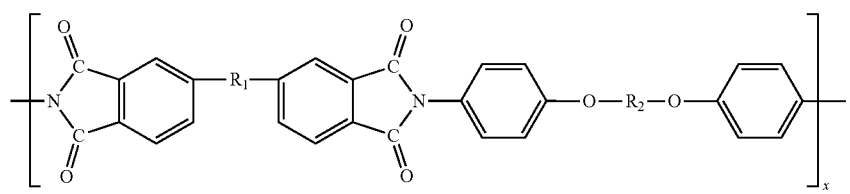

Formula 2 where the mole ratio of the diamine monomer to the dianhydride monomer is 1:1; and the mole ratio of the amine monomer to the dianhydride monomer is (0.02-0.15):1. When the amine monomer contains two amino groups, the mole ratio of the dianhydride monomer to the amine monomer is preferably 1:(0.02-0.075); and when the amine monomer contains one amino group, the mole ratio of the dianhydride monomer to the amine monomer is preferably 1:(0.05-0.15), and more preferably 1:(0.05-0.1).

In step 1), the mole ratio of the dimethylacetamide solvent for dissolving the diamine monoimer to the diamine monomer is (10-30):1; and the mole ratio of the dimethylacetamide solvent for dissolving or mixing the amine monomer to the amine monomer is (10-30):1.

In step 3), the solid content and viscosity of the reaction liquid are adjusted by adding an adjuvant and the dimethynylene ether with polystyrene, and a polymer alloy obtained by comixing polybutylene terephthalate with polycarbonate.

Preferably a polyether-ether-ketone material in the present invention.

The second purpose of the present invention is to provide a preparation method of any of the insulated wires, including:

when the insulating layer is only a thermoplastic resin layer, heating the resin of the insulating layer to a molten state, and coating the surface of the conductor;

when the insulating layer includes the bonding layer and the thermoplastic resin layer, respectively heating the resin of the bonding layer and the thermoplastic resin layer to the molten state, first coating the surface of the conductor with the bonding layer, and further coating the surface of the bonding layer with the thermoplastic resin layer;

and after coating with the thermoplastic resin layer, rapidly cooling and shaping the insulating layer within 5-25 seconds under a vacuum condition, where the mold structure for 28 shaping is adaptive to the sunken part in the insulating layer.

The third purpose of the present invention is to provide a coil, including the insulated wire.

The purpose of the present invention is also to provide an electrical or electronic device manufactured using the coil.

Compared with the prior art, the present invention has the following advantages:

According to the insulated wire provided by the present invention, a channel for introducing a cooling medium can be formed in the insulated wire, and the cooling medium is in direct contact with the wire, being large in contact area, rapid in cooling speed, and high in efficiency.

Figure 1:
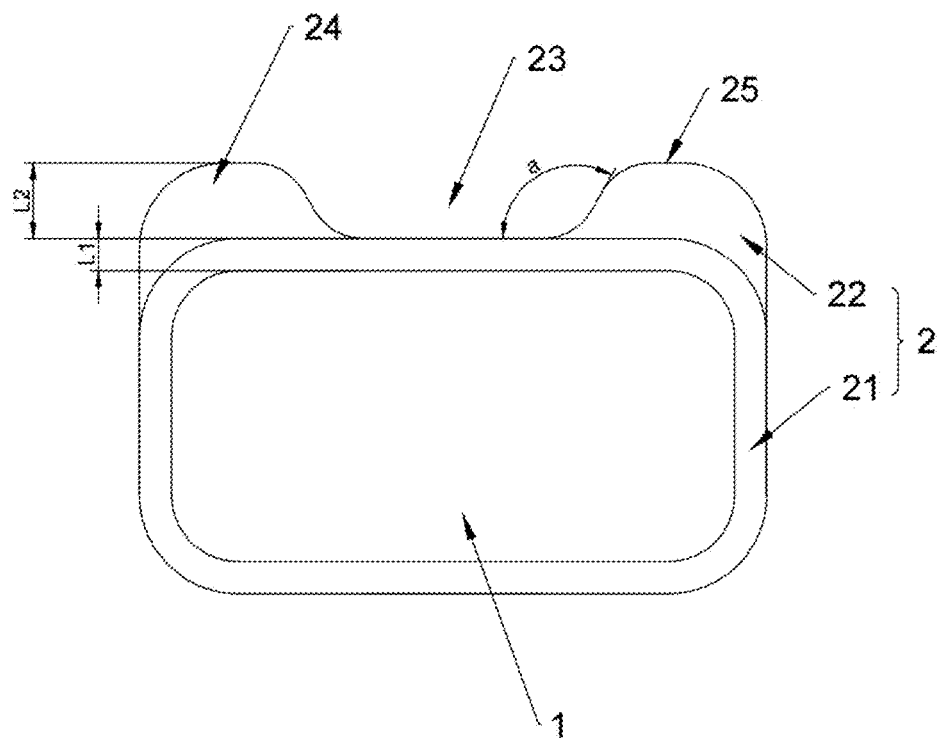
FIG. 1 is a structural schematic diagram of the present invention that a sunken part is arranged on one side of a conductor.

REFERENCE NUMERALS IN THE FIGURES 1. conductor; 2. insulating layer; 21. bonding layer; 22. thermoplastic resin layer; 23. sunken part; 24. convex part; 25. straight line part;
3. channel.

DETAILED DESCRIPTION OF THE EMBODIMENTS

A number of specific details are set forth in the description below to provide a thorough understanding for the present invention. However, the present invention may also be implemented in other manners different from those described herein, and those skilled in the art may make similar generalization without departing from the essence of the present invention, therefore, the present invention is not limited by the specific embodiments disclosed below.

Unless otherwise stated, all technical and scientific terms used in the embodiments of the present invention have the same meaning as those commonly understood by those skilled in the technical field of the present invention. The terms used in the present invention are only for the purpose of describing the specific embodiments and are not intended to limit the scope of the present invention.

Embodiment 1

Figure 6:
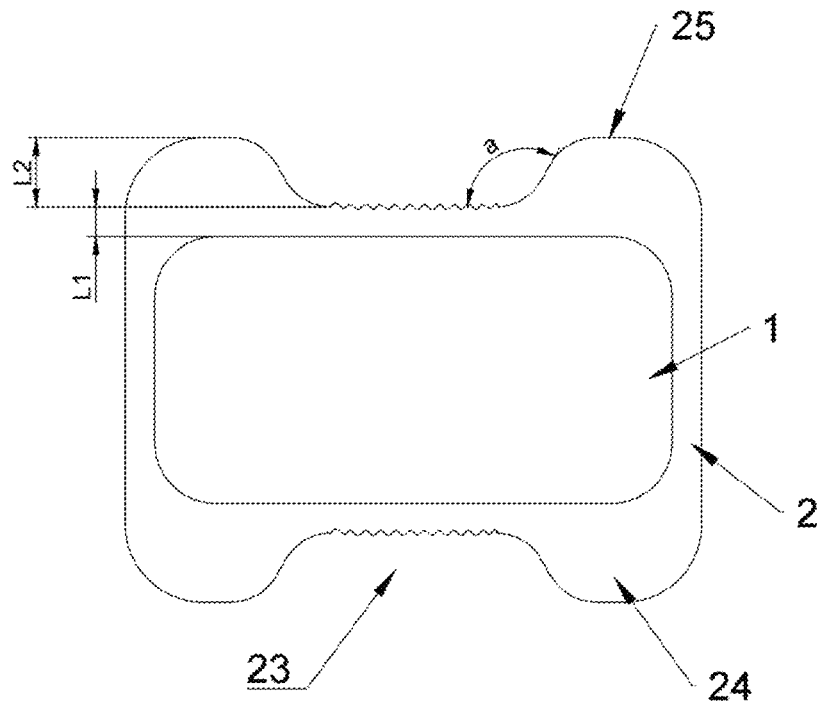
FIG. 6 is a schematic diagram of the present invention that the bottom of a sunken part is of a wavy structure.

Referring to FIG. 1 and FIG. 6, the embodiment provides an insulated wire, including a conductor 1 and an insulating layer 2 arranged at the periphery of the conductor 1, where the cross section of the conductor 1 takes the shape of a rectangle, specifically an oblong rectangle, or in some embodiments, a square rectangle, which can be adjusted according to actual use scenes; in the embodiment shown in the figures, the cross section of the conductor 1 takes the shape of a rounded rectangle, that is, is tabular; a sunken part 23 is formed in the insulating layer 2 on at least one surface of the conductor 1; the sunken part 23 extends along the whole length direction of the insulating layer 2; a convex part 24 is formed in the left and right sides of the sunken part 23;

the distance between the bottommost part of the sunken part 23 and the surface of the conductor 1 is L1; L1 is 50 μm-300 μm; the distance between the bottommost part of the sunken part 23 and the highest point of the convex part 24 is L2; and the value that L1 is divided by the sum of L2 and L1 is greater than 1.3 and smaller than or equal to 10, and preferably 3-7.

Figure 2:
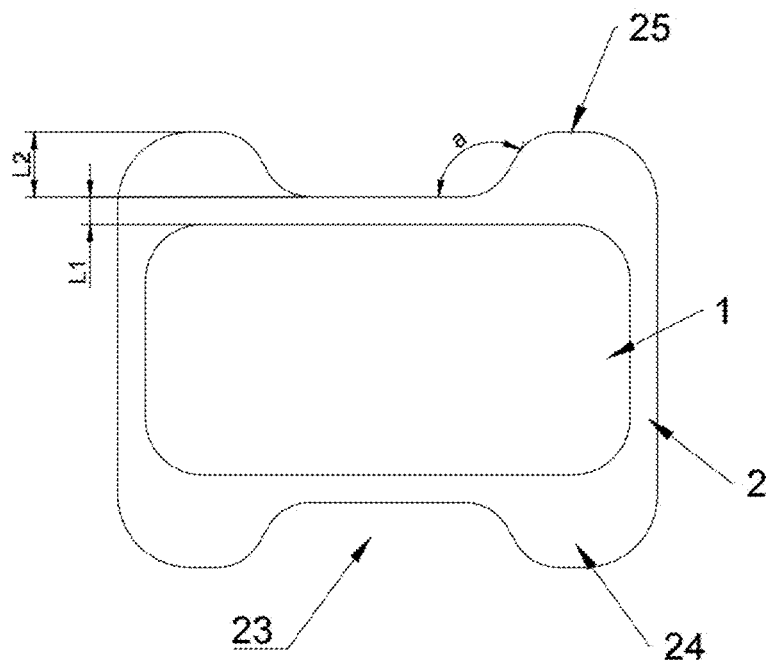
FIG. 2 is a schematic diagram of the present invention that an insulating layer is one layer.
Figure 3:
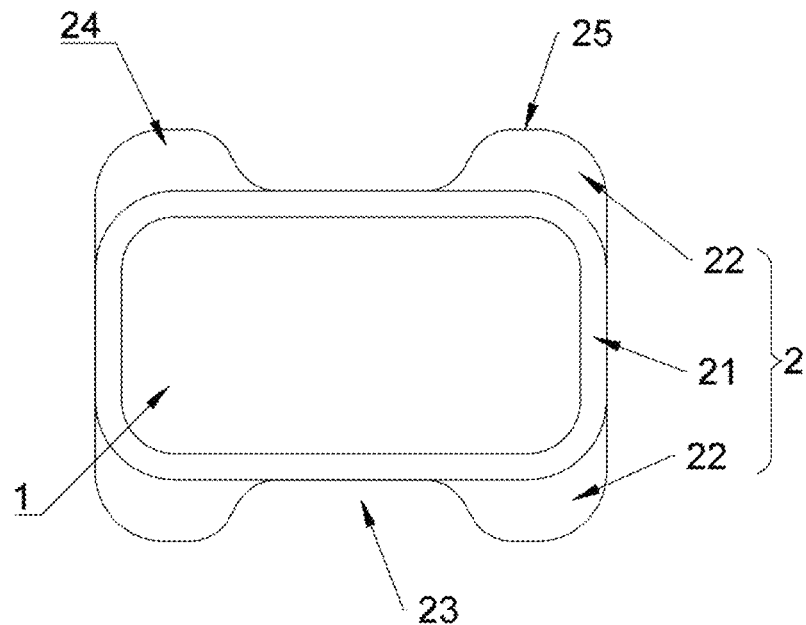
FIG. 3 is a schematic diagram of the present invention that a thermoplastic resin layer only forms a convex part.
Figure 4:
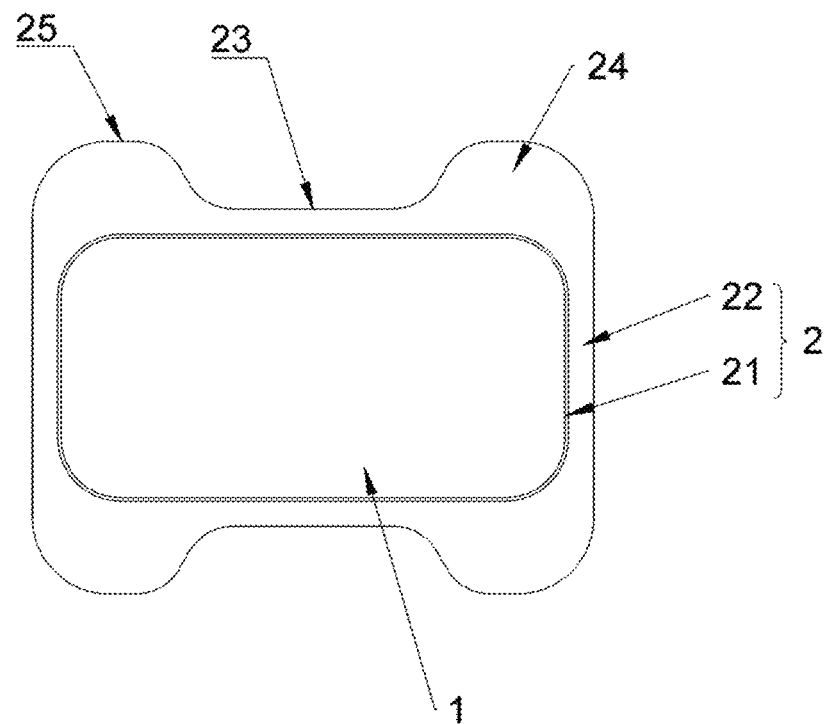
FIG. 4 is a schematic diagram of the present invention that the insulating layers are two layers and the convex part is only formed by the thermoplastic resin layer.
Figure 5:
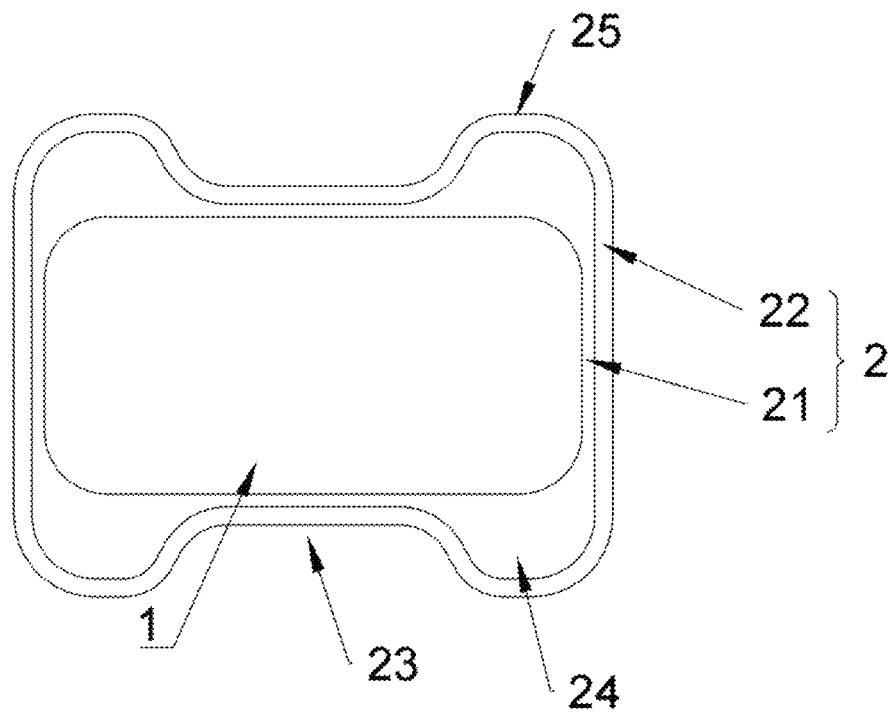
FIG. 5 is a schematic diagram of the present invention that the insulating layers are two layers and the convex part is formed by the thermoplastic resin layer and a bonding layer together.

In the embodiment, the insulating layer 2 includes a thermoplastic resin layer 22 or a combination of the thermoplastic resin layer 22 with a bonding layer 21, and the thermoplastic resin layer 22 is on the outermost side of the insulating layer 2. In other embodiments, the insulating layers 2 can be of a structure of 3 layers or 3 layers more, which can be set according to different use scenes, and a structure of the combination of the bonding layer 21 and the thermoplastic resin layer 22 is preferred in the embodiment. As shown in FIG. 2 and FIG. 6, the insulating layer is of a structure of only the thermoplastic resin layer 22; and as shown in FIG. 3, FIG. 4 and FIG. 5, the insulating layer is all of a structure of the bonding layer 21 and the thermoplastic resin layer 22.

The material of the bonding layer 21 can be a thermosetting material, and can be directly formed by coating the surface of the conductor and baking and curing, which can be at least one 4 of polyimide, polyurethane, polyamideimide, thermosetting polyester, H-class polyester, polybenzimidazole, polyester imide, melamine resin and epoxy resin.

In some preferable embodiments, the material of the bonding layer structurally includes the structure shown in formula 1. In the embodiment, the bonding layer of the structure shown in formula 1 is capable of on one hand enhancing the bonding force with the surface of the conductor 1, and enhancing the adhesion to the thermoplastic resin layer 22. In addition, due to adoption of the bonding layer 21, a better shaping effect can be achieved for the sunken part 23 and the convex part 24 on the insulating layer 2.

In the embodiment, the material of the thermoplastic resin layer 22 is at least one of general engineering plastic, super engineering plastic or a polymer alloy containing engineering plastic.

The general engineering plastic includes any one or a combination of polyamide, polyacetal, polycarbonate, polyphenylene ether, syntactic polystyrene resin, polybutylene terephthalate, polyethylene terephthalate, polyethylene naphthalate and polyethylene.

The super engineering plastic includes any one or a combination of polyetherimide, polyphenylene, polysulfone, polysulfone, polyethersulfone, polyphenylene sulfide, polyarylester, polyamide-imide, polyether ketone, polyaryletherketone, tetrafluoroethylene ethylene copolymers, polyether-ether-ketone, polyethylene ketone ketone, tetrafluoroethylene-perfluoroalkyl vinyl ether copolymers, polytetrafluoroethylene, thermoplastic polyimide resin, thermoplastic polyamide-imide and liquid crystal polyester.

The polymer alloy containing engineering plastic includes a polymer alloy with polyethylene terephthalate and polyethylene naphthalate as basic resins, a polymer alloy obtained by comixing ABS with polycarbonate, a polymer alloy obtained by comixing nylon 6,6 with an aromatic polyamide resin, a polymer alloy obtained by polyphenylene ether with nylon 6,6, a polymer alloy obtained by polyphenylene ether with polystyrene, and a polymer alloy obtained by comixing polybutylene terephthalate with polycarbonate.

In the embodiment, the thermoplastic resin layer 22 is preferably a polyether-ether-ketone material, and polyether-ether-ketone has good bonding force with the structure shown in formula 1.

Figure 7:
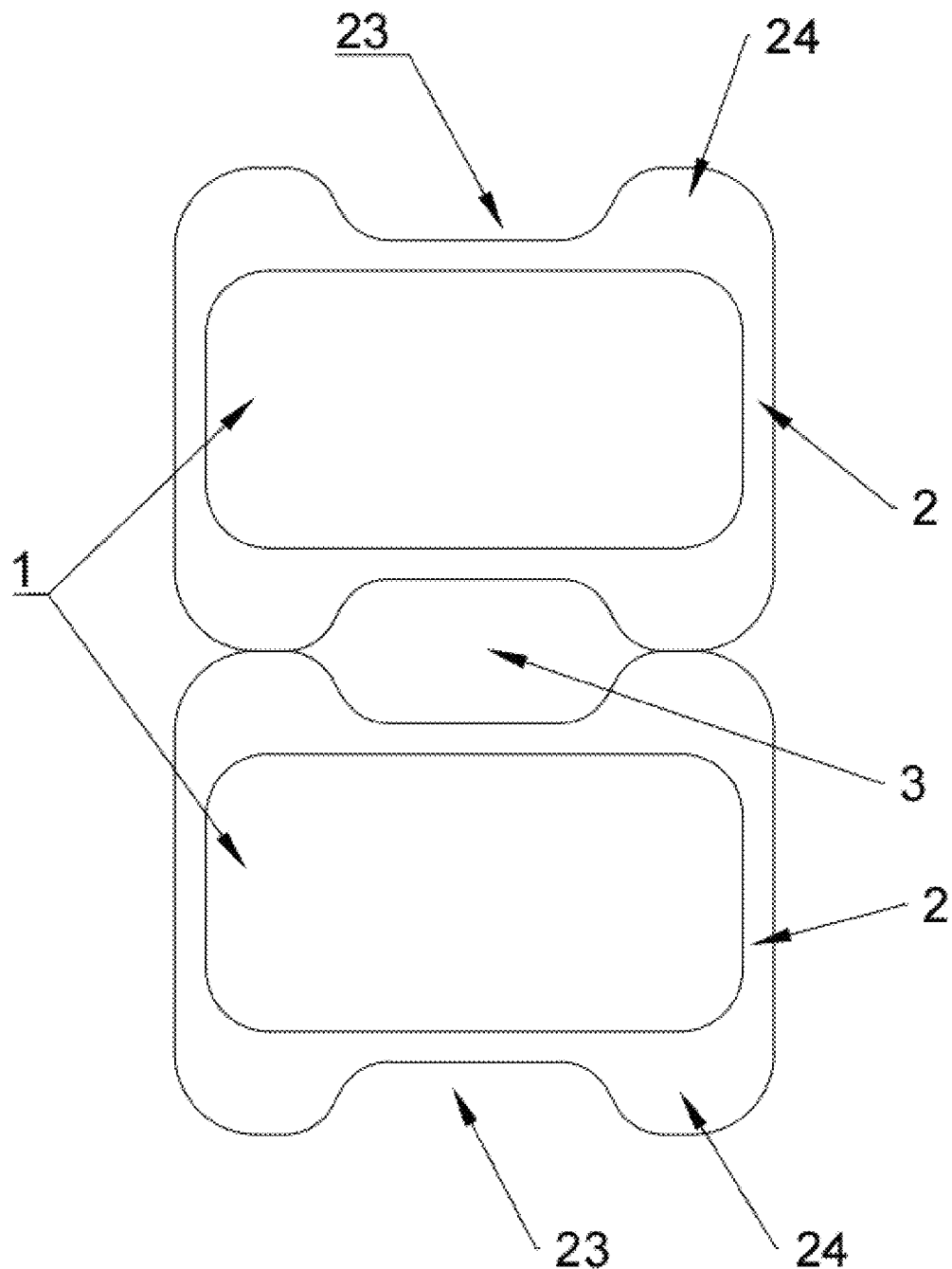
FIG. 7 is a structural schematic diagram of the present invention that an upper insulated wire and a lower insulated wires are overlapped, and sunken parts are arranged on both sides of the insulated wires.
Figure 8:
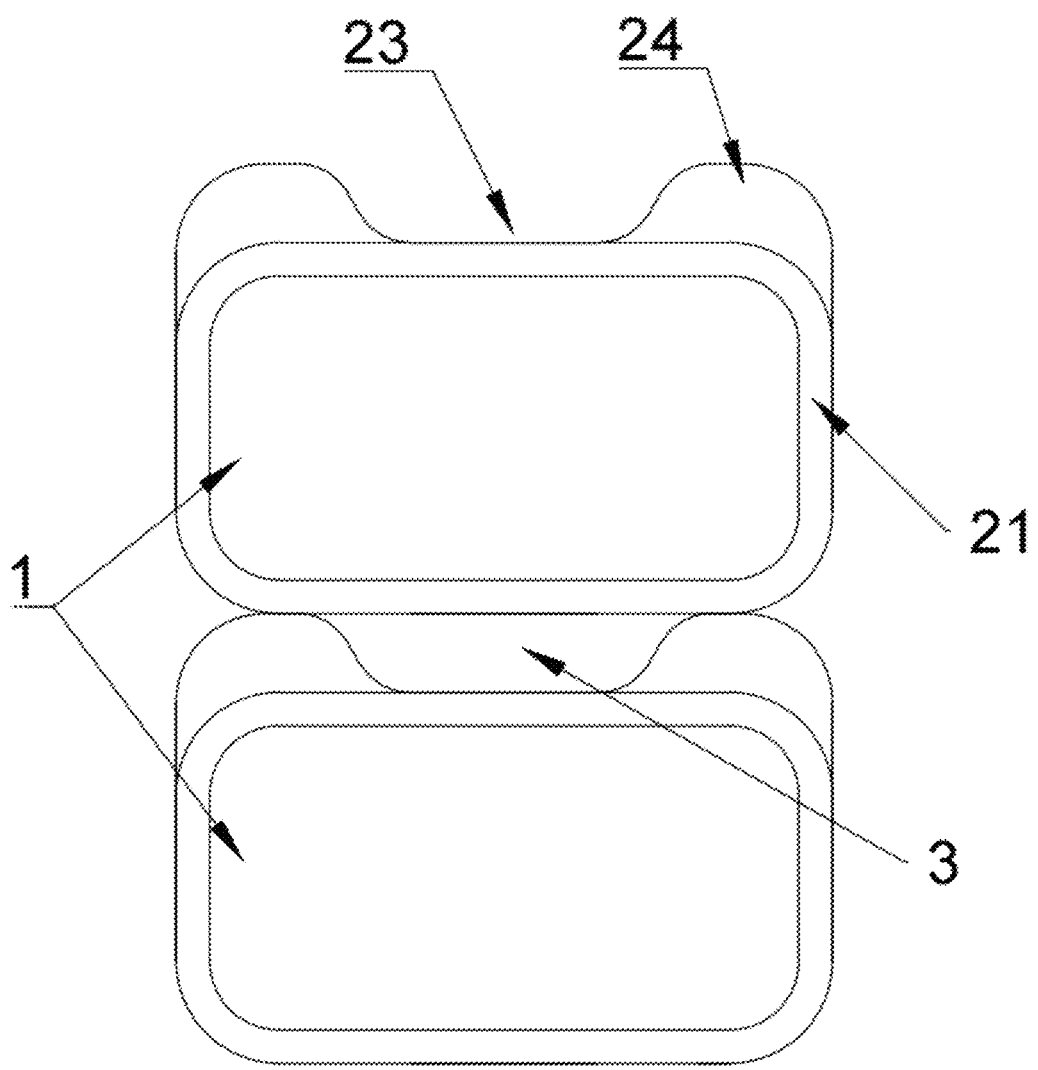
FIG. 8 is a structural schematic diagram of the present invention that an upper insulated wire and a lower insulated wires are overlapped, and the sunken part is only arranged on one side of the insulated wire.

As shown in FIG. 7 and FIG. 8, when the insulated wires are arranged inside a motor, two upper and lower wires are adhered to each other, then a channel 3 through which a cooling medium flows is formed in the middle, and thus the cooling medium can be in mutual contact with the surfaces of the insulated wires.

In the embodiment, to ensure the heat dissipation and cooling effect of the insulated wires, generally, the larger the depth of the sunken part 23, that is, the value of L2, the better (the higher the convex parts 24 on both sides). However, due to the poor heat dissipation performance of the insulating layer 2, the larger L2, the larger L2+L1, and the thicker the insulating layer 2, then heat dissipation can be impeded. In addition, a larger thickness of the insulating layer 2 in the wires can affect the number of coils wound. Therefore, in the embodiment, while ensuring that the value that L1 is divided by L2 is greater than or equal to 1.3 and smaller than or equal to 10, the value of L2 can be within 30 μm-3000 μm. Further, the closer the bottom of the sunken part 23 to the surface of the conductor 1, the better, that is, the smaller the value of L1, the better. However, limited by the manufacturing process, and to ensure the insulating effect, in the embodiment, L1 is set as 50 μm-300 μm.

What needs to be noted is that generally the larger the width of the sunken part 23 on the surface, the more the cooling medium flowing therethrough, and the better the heat dissipation effect for the insulated wire, therefore, while meeting the process, the width can be the largest preferably.

Referring to FIG. 2 to FIG. 6, at least one sunken part 23 is arranged on both two long sides of the conductor 1. The insulating layer 2 in FIG. 2 is of a one-layer structure, and the insulating layer 2 can be the bonding layer 21 or the thermoplastic resin layer 22. In some embodiments, as shown in FIG. 3, one bonding layer 21 first wraps around the conductor 1, and two thermoplastic resin layers 22 in interval distribution are respectively extruded or smeared on two long sides of the conductor, then the convex parts 24 are formed, and the sunken part 23 is formed between the two convex parts 24. In some embodiments, as shown in FIG. 4, the insulating layers 2 are set as two layers, respectively the bonding layer 21 and the thermoplastic resin layer 22 sequentially arranged from inside to outside, and the convex part is only formed by the thermoplastic resin layer 22. In some embodiments, as shown in FIG. 5, the insulating layers 2 are also two layers, and the convex part 24 is formed by the thermoplastic resin layer 22 and the bonding layer 21 together. That is, in specific use, the number of the insulating layers and the form of the convex part can be adaptively adjusted according to different needs and processes, which is not specifically limited here.

Further, referring to FIG. 6, to further increase the contact area of the cooling medium with the insulated wire, in some preferable embodiments, the bottom of the sunken part 23 is set into a structure with a wavy cross section.

Continuously referring to FIG. 1 and FIG. 6, the angles between two lateral sides of the sunken part 23 and the bottom of the sunken part 23 are both a, $150°≥a≥90°$. In a preferable embodiment, when the included angle a is 90°, the width of the sunken part 23 is the largest, facilitating to form a larger channel 3, more cooling medium can flow through, and thus the heat dissipation and cooling efficiency can be further improved.

Continuously referring to FIG. 1 to FIG. 8, in some embodiments, a straight line part 25 extending in the width direction is formed on the convex part 24, and the straight line part 25 can cover the width of the whole convex part 24 or partially cover. In the embodiment shown in the figure, the straight line part 25 is arranged in the middle in the width direction of the convex part, and the left and right sides of the straight line part 25 are arc-shaped, that is, viewed from the cross section of the insulated wire, the upper end surface of the convex part 24 is formed by an arc-shaped section, a straight line part and an arc-shaped section through connection. Due to the straight line part 25 formed on the convex part 24, the sealing property of the channel 3 can be improved, ensuring that the cooling medium flows completely along the channel 3, and preventing the cooling medium from flowing outside the channel 3 in the motor to affect circulation of the cooling medium with the outside. The arc-shaped sections on both sides can be formed by the thermoplastic resin layer 22 through natural flowing at a high temperature in the manufacturing process, and meanwhile, due to transition of the arc-shaped sections, the structural strength of the insulating layer 2 can be improved.

Embodiment 2

The embodiment provides a preparation method of the insulated wire that only one insulating layer is arranged on the surface of the conductor, that is, only the thermoplastic resin layer is used 28 as the insulating layer, including the following preparation steps:

for directly processing only the thermoplastic resin layer as the insulating layer on the conductor, heating an insulating resin to a molten state, coating the surface of the conductor, rapidly cooling within a short time (5-25 seconds) under a vacuum condition after coating to rapidly reduce the temperature of the thermoplastic resin layer to be lower than the crystallization temperature so as to conduct rapid cooling molding on the resin to prevent the resin from flowing deformation.

While manufacturing the thermoplastic resin layer, the sunken part is formed on the thermoplastic resin layer by using a mold, that is, a structure adaptive to the size of the sunken part is arranged on the mold, for forming the sunken part in extrusion.

In the embodiment, by conducting rapid cooling under the vacuum condition, the temperature of the resin of the thermoplastic resin layer can be rapidly reduced to be lower than the crystallization temperature, then the adhesion of the insulating layer to the conductor can be improved, the resin of the thermoplastic resin layer can be rapidly cured and molded, and thus a product with the sunken part and the convex part qualified in size can be formed.

Embodiment 3

In the embodiment, two insulating layers are arranged, namely the bonding layer and the thermoplastic resin layer, and the preparation method includes:

first, coating the conductor with the bonding layer, the bonding layer can be smeared and baked and cured to obtain a half-finished product, or a half-finished product can be obtained through an extrusion process, and then manufacturing the thermoplastic resin layer by using the extrusion process on the outer surface of the half-finished product, where the method of manufacturing the thermoplastic resin layer is identical to the operation mode in Embodiment 2.

While manufacturing the thermoplastic resin layer, the sunken part is formed on the thermoplastic resin layer by using a mold, that is, a structure adaptive to the size of the sunken part is arranged on the mold, for forming the sunken part in extrusion.

In the embodiment, by conducting rapid cooling under the vacuum condition, the temperature of the resin of the thermoplastic resin layer can be rapidly reduced to be lower than the crystallization temperature, then the adhesion of the thermoplastic resin layer to the bonding layer can be improved, the resin of the thermoplastic resin layer can be rapidly cured and molded, and thus a product with the sunken part and the convex part qualified in size can be formed. In addition, a bonding layer is first arranged on the conductor, then the thermoplastic resin layer is processed on the bonding layer, further ensuring that the sunken part on the thermoplastic resin layer meets the specification and size, deformation of the sunken part and the convex parts at both ends can be reduced, unqualified products can be reduced, and the product pass percent can be increased.

Embodiment 4

The bonding layer is prepared by the following steps:
1) preparing a diamine monomer solution and an amine monomer solution Mixing 0.1 mol of a diamine monomer, namely 3,3',4,4'-diphenyl ether dianhydride, with 2 mol of a dimethylacetamide solvent, and under a nitrogen protected atmosphere, stirring to react for 1.5 h at 0 DEG C. till the diamine monomer is dissolved so as to obtain a diamine monomer solution;

mixing 0.01 mol of an amine monomer, namely aniline, with 0.2 mol of a dimethylacetamide solvent, and under a nitrogen protected atmosphere, stably stirring to react for 1-2 h at 0 DEG C. till the aniline is completely dissolved and mixed so as to obtain an aniline solution;

2) adding 0.1 mol of a dianhydride monomer, namely 3,3',4,4'-diphenyl ether dianhydride, into the diamine monomer solution, and under a nitrogen protected atmosphere, stirring to react for 12 h at 0 DEG C. so as to obtain a polydietheretheramide acid solution;

3) adding the aniline solution into the polydietheretheramide acid solution, stirring to react at 0 DEG C. for 3 h, adjusting an adjuvant (including a leveling agent, a defoaming agent, a diluent and a toughening agent) and a dimethylacetamide solvent to adjust the solid content of the reaction liquid to be greater than 21% and the viscosity to 3300 mPa·S so as to obtain a polydietheretheramide acid finished product;

4) coating the conductor, namely a copper wire, with the polydietheretheramide acid finished product, heating to 275 DEG C. to react for 25 min, a drying effect is also achieved during the reaction, removing the dimethylacetamide solvent in the finished product, after the heating is completed, continuously heating to 450 DEG C., and keeping for about 30 seconds so as to form the bonding layer on the surface of the conductor;

further processing the thermoplastic resin layer on the surface of the bonding layer in the mode in Embodiment 3, thereby obtaining the insulated wire.

In the embodiment, the thermoplastic resin layer is a polyether-ether-ketone resin, the conductor takes the shape of a rounded rectangle, and the sunken parts are arranged on two long sides of the thermoplastic resin layer, so that the cross section of the insulated wire generally takes the shape of H, that is, the structure as shown in FIG. 2 or FIG. 4.

Embodiment 5

The only difference between the embodiment and Embodiment 4 is that:

the diamine monomer used is 1,3-bis(4'-amino phenoxy) benzene; the amine monomer used is propylamine; and the dianhydride monomer used is bisphenol A dianhydride.

Other structures are identical to those of Embodiment 4.

Embodiment 6

The only difference between the embodiment and Embodiment 4 is that:

the diamine monomer used is 4,4'-bis(4"-amino phenoxy) diphenyl ketone; the amine monomer used is 1-naphthylamine; and the dianhydride monomer used is 3,3', 4,4'-triphenyl diether tetracarboxylic dianhydride.

Other structures are identical to those of Embodiment 4.

Comparative Embodiment 1

The only difference between the embodiment and Embodiment 4 is that:

No aniline solution is added in the preparation process.

Comparative Embodiment 2

The only difference between the embodiment and Embodiment 4 is that:

directly coating the surface of the conductor with the thermoplastic resin layer to form the insulated wire, that is, no bonding layer is arranged.

Comparative Embodiment 3

The only difference between the embodiment and Embodiment 5 is that:

when smearing the thermoplastic resin layer, a common cooling mode is adopted, that 28 is, conducting water cooling in a cooling tank in normal pressure air, and the cooling time is longer than 30 seconds.

The insulated wires prepared in Embodiments 4-6 and comparative Embodiments 1-3 are subjected to performance tests, and the results are shown in the Table 1 below:

TABLE 1 performance test results

| Item | Thickness uniformity of sunken part | Thickness uniformity of convex part | Adhesion test |
|---|---|---|---|
| Embodiment 4 | A+ | A+ | A+ |
| Embodiment 5 | A+ | A+ | A+ |
| Embodiment 6 | A+ | A+ | A+ |
| Comparative Embodiment 1 | A | A | B |
| Comparative Embodiment 2 | B | B | C |
| Comparative Embodiment 3 | B | C | A+ |

The thickness uniformity of the sunken part is tested according to the following mode:
respectively taking insulated wires as test samples, arbitrarily selecting 10 points in any position of the insulated wires, conducting sunken part thickness measurement based on the positions of the 10 selected points, taking the numerical mean as the thickness of the sunken part of the sample, further calculating the standard deviation of the thickness of the sunken part, and obtaining the coefficient of variation (C.V) of the thickness of the sunken part. Coefficient of variation (C.V)=standard deviation/mean.
A+: 5% and lower;
A: greater than 5% and less than 10%;
B: greater than 10% and less than 15%;
C: greater than 15%, The test method of uniformity of the convex part is identical to the test method of the thickness of the sunken part.

Adhesion test: taking an insulated wire of 300 mm long as a test sample, bending the test sample around a polished test shaft for 180±2°, then tensioning and straightening, and cutting for one circle till the conductor in the middle of the measuring length, and after tensioning for 20%, checking whether the test sample loses the adhesion. One test sample is tested, if the adhesion is lost, record in a report, and from the cutting point, the length of losing the adhesion is tested in one way. The evaluation criteria are as follows:
A+: less than 2.0 mm;
A: greater than 2.0 mm and less than 3 mm
B: greater than 3 mm and less than 4 mm;
C: greater than 4 mm.

The tests show that due to the material of the bonding layer provided by the present invention, the adhesion of the insulated wire can be remarkably improved, that is, the adhesion of the bonding layer to the thermoplastic resin layer and the conductor can be remarkably improved. Due to adoption of the bonding layer, the uniformity of the size of the thickness of the sunken part and the convex part of the insulated wire can be improved, thus increasing the pass percent of the product. In addition, the manufacturing process of the thermoplastic resin layer provided by the present invention also effectively ensures the thickness uniformity of the product.

Various technical features of the above embodiments can be arbitrarily combined. For brevity of description, all possible combinations of various technical features in the above embodiments are not described. However, as long as there is no contradiction between the combinations of these technical features, they should all be considered as a scope recited in this specification.

The above embodiments merely represent implementations of the present invention and are described in a more specific and detailed manner, but should not be understood to limit the patent scope of the present invention. It should be noted that several variations and improvements may also be made without departing from the concept of the present invention to those of ordinary skill in the art, and these variations and improvements should all fall within the protection scope of the present invention. Therefore, the protection scope of the present invention shall be subject to the appended claims.

What is claimed is:
1. An insulated wire comprising:
a conductor; and
an insulating layer arranged at the periphery of the conductor,
wherein:
a cross section of the conductor takes a shape of a rectangle, a sunken part is formed in the insulating layer on at least one surface of the conductor, the sunken part extends in a whole length direction of the insulating layer, and a convex part is formed in a left and right sides of the sunken part;
a distance between a bottommost part of the sunken part and a surface of the conductor is L1, L1 is 50 μm-300 μm, the distance between the bottommost part of the sunken part and a highest point of a convex part is L2, and the the value of (L2+L1)/L1 is 3-7;
angles between two lateral sides of the sunken part and a bottom of the sunken part are both a, and 150°≥a≥90°;
an upper wire and a lower wire are adhered to each other, then a channel through which a cooling medium flows is formed in a middle;
the insulating layer comprises a combination of a thermoplastic resin layer with a bonding layer, and the thermoplastic resin layer is on an outermost side of the insulating layer;
wherein a material of the bonding layer structurally comprises a polymerization unit as shown in formula 1 below:

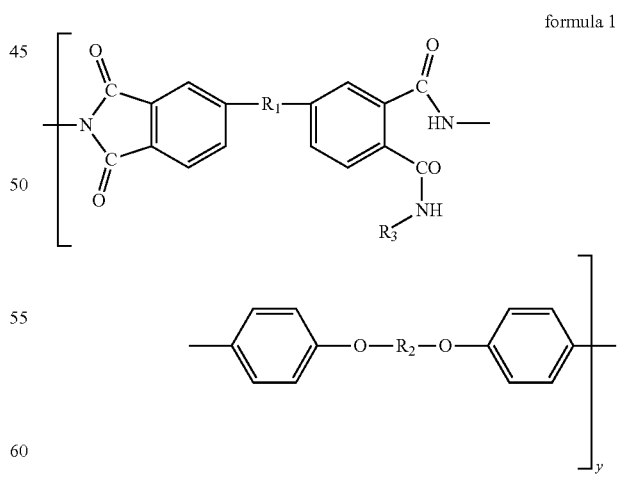

in the formula, R1 and R2 are both aryl; and R3 is C2-12 alkyl;
and a polymerization unit as shown in formula 2 below, the ratio of formula 1 being 5-15%, and x+y is 10-10000;

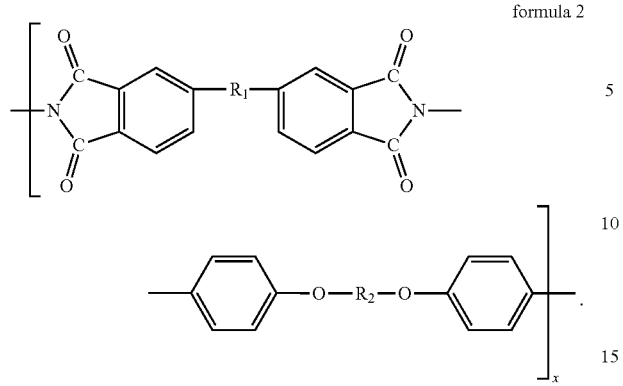

formula 2

2. The insulated wire according to claim 1, wherein the cross section of the conductor takes the shape of a rounded rectangle, and at least one sunken part is formed on both two long sides thereof.

3. The insulated wire according to claim 1, wherein the bottom of the sunken part takes the shape of waves on the cross section.

4. The insulated wire according to claim 1, wherein a straight line part extending in a width direction is formed on the convex part.

5. The insulated wire according to claim 1, wherein a preparation method of the insulated wire comprising:

when the insulating layer comprises the bonding layer and the thermoplastic resin layer, respectively heating the resin of the bonding layer and the thermoplastic resin layer to a molten state, first coating the surface of the conductor with the bonding layer, and further coating a surface of the bonding layer with the thermoplastic resin layer;

and after coating with the thermoplastic resin layer, rapidly cooling and shaping the insulating a layer within 5-25 seconds under a vacuum condition, wherein a mold structure for shaping is adaptive to the sunken part in the insulating layer.

6. A coil comprising the insulated wire according to claim 1.

7. An electrical/electronic device comprising the coil according to claim 6.

* * * * *